(12) United States Patent
Perrillat et al.

(10) Patent No.: US 10,076,882 B2
(45) Date of Patent: Sep. 18, 2018

(54) METHOD OF MANUFACTURING A COMPOSITE PART

(71) Applicant: Hexcel Reinforcements SAS, Dagneux (FR)

(72) Inventors: Pascal Perrillat, Dagneux (FR); Sylvain Delalande, Dagneux (FR)

(73) Assignee: Hexcel Reinforcements SAS, Dagneux (FR)

( * ) Notice: Subject to any disclaimer, the term of this patent is extended or adjusted under 35 U.S.C. 154(b) by 52 days.

(21) Appl. No.: 15/123,749

(22) PCT Filed: Apr. 16, 2015

(86) PCT No.: PCT/EP2015/058336
§ 371 (c)(1),
(2) Date: Sep. 6, 2016

(87) PCT Pub. No.: WO2015/158865
PCT Pub. Date: Oct. 22, 2015

(65) Prior Publication Data
US 2017/0072647 A1 Mar. 16, 2017

(30) Foreign Application Priority Data

Apr. 16, 2014 (EP) ..................................... 14164909

(51) Int. Cl.
*B29C 70/34* (2006.01)
*B29C 70/44* (2006.01)
(Continued)

(52) U.S. Cl.
CPC ........ *B29C 70/342* (2013.01); *B29C 43/3642* (2013.01); *B29C 70/36* (2013.01);
(Continued)

(58) Field of Classification Search
CPC ........ B29C 43/3642; B29C 2043/3644; B29C 70/443; B29C 70/462; B29C 70/48;
(Continued)

(56) References Cited

U.S. PATENT DOCUMENTS

2008/0237909 A1* 10/2008 Bech ...................... B22F 5/007
264/101
2010/0007056 A1 1/2010 Jacob et al.
(Continued)

FOREIGN PATENT DOCUMENTS

DE 102006031334 A1 1/2008
EP 2662202 A2 * 11/2013 ............. B29D 22/00
(Continued)

OTHER PUBLICATIONS

PCT Search Report—PCT/EP2015/058336.

*Primary Examiner* — Vishal I Patel
(74) *Attorney, Agent, or Firm* — W. Mark Bielawski; David J. Oldenkamp (57) ABSTRACT

A method of preparing a stringer (101) and panel (103) lay-up comprising the steps of providing a stringer preform (303), a panel preform (508), a filler (309) and a mold (307). The mold is adapted to define an inner surface of a stringer. The method further comprises the steps of arranging the stringer preform (303) to contact the mold (307), placing filler (309) material between the mold (307) surface and stringer preform (303), and bringing the reinforcement material (303) into contact with the panel preform (508). The shape of the mold (307) is configured to control filler (309) placement and/or filler shape and/or filler volume.

5 Claims, 6 Drawing Sheets

(51) Int. Cl.
  *B29C 70/46* (2006.01)
  *B29C 70/48* (2006.01)
  *B29C 70/54* (2006.01)
  *B29C 70/88* (2006.01)
  *B29D 99/00* (2010.01)
  *B29C 43/36* (2006.01)
  *B29C 70/36* (2006.01)
  B29C 33/50 (2006.01)
  B29K 105/16 (2006.01)
  B29L 31/10 (2006.01)

(52) U.S. Cl.
  CPC .......... *B29C 70/443* (2013.01); *B29C 70/462* (2013.01); *B29C 70/48* (2013.01); *B29C 70/546* (2013.01); *B29C 70/885* (2013.01); *B29D 99/0014* (2013.01); *B29C 33/505* (2013.01); *B29C 2043/3644* (2013.01); *B29K 2105/16* (2013.01); *B29K 2995/0005* (2013.01); *B29L 2031/10* (2013.01)

(58) Field of Classification Search
  CPC ... B29C 70/546; B29C 70/885; B29C 33/505; B29C 70/342; B29C 70/36; B29D 99/0014; B29K 2105/16; B29K 2995/0005; B29L 2031/10
  See application file for complete search history.

(56) References Cited

U.S. PATENT DOCUMENTS

| | | |
|---|---|---|
| 2010/0140834 A1 | 6/2010 | Travis et al. |
| 2011/0084428 A1 | 4/2011 | Wade et al. |
| 2011/0139932 A1* | 6/2011 | Matheson ............... B64C 3/182 244/132 |

FOREIGN PATENT DOCUMENTS

| | | |
|---|---|---|
| EP | 2662202 A2 | 11/2013 |
| GB | 2475523 A | 5/2011 |

* cited by examiner

METHOD OF MANUFACTURING A COMPOSITE PART

INTRODUCTION

The present invention relates to a method of forming a stringer stiffened lay-up for an aerospace structure, particularly but not exclusively to a stringer stiffened panel formed thereby, and to a mould used in the production thereof.

BACKGROUND

Aircraft structures are built with stringers (also known as stiffeners) to increase the structure's resistance to loads, particularly bending loads. The stringers are often coupled to the wing or fuselage skin and generally extend in a span-wise direction along the wing interior or along the fuselage length. Stringers may be provided in a variety of different cross-sectional shapes and sizes including, but not limited to, an I-beam shaped cross section and/or a hat-shaped cross-section. The hat-shaped stringer is also referred to as an omega stringer. A hat-shaped or omega stringer comprises two flange portions which are bonded to the panel, from these extend two webs which extend upwardly from the flanges, the webs are connected by a cap which in combination with the webs and the panel enclose a trapezoidal cross-section.

Composite materials are widely used in aerospace applications because of their relatively light weight and favourable physical properties. One such category of composites used in aircraft manufacture is the prepreg. Prepreg is short for 'pre-impregnated', which refers to a fibrous reinforcement, typically a carbon fibre fabric, which is combined with a matrix material such as an epoxy resin, to form an impregnated fibre fabric which upon its use is laid up in a mould and cured to form a composite part.

Prepreg production of aircraft parts typically necessitates the lay-up to be cured in an auto-clave. The high pressure difference of the autoclave reduces the extent of porosity in the final cured part. This is necessary because pores in a composite can act as stress concentrators and are initiation sites for crack propagation. In addition, autoclaves are expensive, and also introduce size constraints into part production. Therefore, there is a preference to produce some aeroplane parts using resin transfer moulding (RTM) or a similar resin infusion process. In such processes a dry fibre preform is used in place of the prepreg, and a liquid resin is infused into a closed mould to completely wet out the dry fibre preform before curing. Infusion allows low porosity composite structures to be produced without the need for an autoclave.

Conventionally stringers are produced by first laying up prepreg that forms the panel structure onto a mould surface. An inflatable bladder or rigid mould core which defines the internal shape of the stringer is then placed on top of the panel lay-up. Further prepreg layers are placed over the bladder to form the stringer. The bladder is inflated and a caul panel placed on top of the assembly to maintain the external shape of the stringer during cure. The caul panel also distributes pressure on the surface of the assembly more evenly. The assembly is then vacuum bagged and cured in an autoclave to co-cure the hat stringer to the skin (see for example US2010007056 A1). In a similar process the stringer can be cured separately, and in a second step it is co-bonded during the cure phase of the panel.

An alternative method of forming a stringer stiffened panel is to first place a prepreg into a concave mould which defines the external shape of a stringer. A bladder which defines the internal shape of the stringer is placed on top of the prepreg, inside of the mould. Sheets of prepreg are then placed across the top of the bladder, to form the panel. Finally a flat caul panel is placed on top of the assembly. The bladder is inflated and the assembly is vacuum bagged and cured in an autoclave. The bladder applies an internal pressure to the stringer, whilst a pressure gradient over the vacuum bag consolidates the assembly. US2011084428 A1 is an example of this method.

The above methods can be adapted to be used with resin infusion processes, in which case preforms of dry-fibre reinforcement material are used in place of prepreg. The preforms are infused with a curable resin, and cured to form the stiffened stringer panel.

Stringer stiffened panels typically exhibit some fibre distortion. This is particularly pronounced when panels are made using infusion processes rather than from prepreg. This is because during infusion of the dry reinforcement, the dry reinforcement can easily be displaced, particularly where the stringer and panel reinforcement contact.

Fibre distortion occurs in particular where the stringer adjoins the panel. Here the defect manifests as parallel grooves visible on the aerodynamic surface of the panel. These defects are located where the flanges transition into the web and are no longer in contact with the panel. Because these defects are located on an aerodynamic surface it becomes necessary to fill them if they exceed a size specified by the aircraft manufacturer. Filing is usually performed by smoothing over the defect with an epoxy paste and then finishing with a surface coating. This increases the processing time, costs and weight of the part. Defects of fibre mal-alignment also result in an undesirable reduction of mechanical properties of the part.

In addition to the above mentioned problems, stringers made by infusion methods in particular can exhibit regions of over impregnation. These areas tend to be on the internal surfaces of the web and cap of the stringer or on the panel where it is contacted by the bladder.

Accordingly, it is desirable to develop a method for producing composite a stringer with fewer defects.

The present invention aims to overcome the above described problems and/or to provide improvements generally.

SUMMARY

According to the present invention, there is provided a method of making a stringer and panel lay-up and a stringer stiffened panel as defined in any of the accompanying claims.

In an embodiment of the present invention is a method of preparing a stringer and panel lay-up comprising the steps of
  a. providing a stringer preform, a panel preform, a filler and a mould, the mould being adapted to define an inner surface of a stringer,
  b. arranging the stringer preform to contact the mould,
  c. placing filler material between the mould surface and stringer preform,
  d. bringing the reinforcement material into contact with the panel preform,
wherein the shape of the mould is configured to control filler placement and/or filler shape and/or filler volume.

In another embodiment of the present invention the lay-up may then be processed into a completed stringer stiffened panel by the following steps:
  e. vacuum bagging the lay-up f. optionally infusing with a curable resin, and g. curing the infused resin or the prepreg resin The stringer preform and the panel preform each comprise a reinforcement material. The reinforcement material is preferably a fibrous reinforcement material.

The incorporation of the filler into the lay-up prevents fibre mal-alignment from occurring during the cure stage. The filler functions by occupying space that the fibres would have otherwise displaced into, and which would otherwise result in a defect in the form of mal-aligned fibres.

The method of the present invention can be used to produce composite components with a reduced extent of the defects.

In an embodiment of the present invention the method is used to form a cured composite omega stringer bonded to a panel. Such a component may be suitable for use as a structure on an airframe. Preferably a stringer stiffened panel produced by the above method is suitable for use on the wings or fuselage of an airframe.

According to the present invention there is also provided a mould for preparing a stringer and panel lay-up wherein shape of the mould is configured to control filler placement and/or filler shape and/or filler volume.

In an embodiment of the present invention the mould is configured to form a space between the reinforcement material of the stringer preform and the mould. This space controls the placement of the filler in relation to the reinforcement material of the stringer preform. This enables a stringer stiffened lay-up to be formed with a more accurate positioning of the filler, this in turn allows less filler to be used, reducing the weight of the final part.

According to a further invention there is provided a sheet material comprising a textured surface. The textured surface promotes air removal and/or resin infusion.

In a preferred embodiment, the textured surface comprises embossing. The embossing may be in the form of channels. The channels may extend in one or more directions. The channels may be parallel. The sheet material may be suitable as a vacuum foil or a vacuum bag.

In a further embodiment, the sheet material forms a mould, preferably a bladder.

The sheet material of this invention may form a vacuum bag or a mould or bladder in any of the inventions as described herein or may be utilised or combined with any of the embodiments as described herein. The mould and/or vacuum bag and/or bladder may be re-usable.

According to another invention there is provided a surface material comprising a sheet material having an air permeable structure to allow air removal, said surface material being locatable on an outer surface of a panel preform. The permeable sheet material may comprise a conductive material such as a metal. The permeable sheet material may be in the form of an electrically conductive foil (ECF) material. This has the important advantage of increasing manufacturing efficiency of combined panel and stringer as this obviates the need for application of electrically conductive materials to the panel preform following its cure and also removes the need for the use of additional vacuum consumables such as bleeders and peel ply.

The permeable sheet material is preferably in contact with a mould or tool surface. This obviates the need for a distribution mesh and/or peel ply.

In an embodiment of the invention, the permeable sheet material is present on the surface of the panel preform of the aforesaid invention, said surface being in contact with a tool or mould.

According to a further embodiment of the invention, the preform panel comprises a resin pre-impregnated fibrous reinforcement material (prepreg), said prepreg further comprising the permeable sheet material. The prepreg may comprise at least one tacky surface. The advantage of this tacky surface is that it holds the panel preform in place.

In another embodiment of the invention, the permeable sheet material is provided on a surface of the prepreg, said surface contacting a mould or tool.

SPECIFIC DESCRIPTION

In an embodiment of the present invention the mould is configured to control the placement and/or shape and/or volume of the filler. The mould is shaped to act as a template for guiding the placement, and/or shape of the filler. In an embodiment of the present invention the mould occupies the volume between the stringer and skin panel minus the volume into which the filler is to be placed.

In an embodiment of the present invention the mould provides a space adjacent to the reinforcement material, the location of which corresponds to sites where defects are anticipated. In a preferred embodiment of the present invention the mould is configured to control the placement of a filler between the mould and the stringer preform where the web of the stringer preform contacts the panel preform.

The mould of the present invention provides a means of accurately locating a position for the filler. This means that smaller defects in fibre alignment can be addressed which require precise placement of filler. The mould of the present invention also gives accurate control over the amount of filler used to prevent a defect, enabling the user to apply only the minimum amount. The use of the internal mould also prevents a surplus of filler being used which can cause defects to form as well as adding unnecessary weight. The optimum quantity and location of filler can be determined through trial and error.

In an embodiment of the present invention the mould remains in place until the lay-up has been cured.

In an embodiment of the present invention the mould may be a solid material, for example cork, polymer, rubber, polymer foam or wood. It may also be a fluid filled object, for example a bladder filled with air or liquid. In embodiments where the mould is left in place until after cure of the part a deformable material such as cork or foam or a fluid filled bladder is preferred to aid removal.

In a preferred embodiment the mould is elongate with substantially an isosceles trapezoidal cross section. Preferably the cross section of the mould is a modified isosceles trapezoidal cross section, where the acute angled corners have been removed. Preferably between 1 and 50 mm of the acute angled corner has been removed, more preferably between 3 and 25 mm. The extent of the corner that is removed determines the volume of filler that can be applied to that region. The optimum volume and location for the filler can be determined simply by trial and error. Each part can be inspected visually or by well-known microscopy techniques. If necessary the mould can be reshaped to adjust the position and volume of filler used. The minimum amount of filler and its optimum position to address a defect can therefore be established.

In an alternative embodiment the method of forming the stringer and skin lay-up comprises the step of removing the mould and replacing it with a fluid filled bladder. The mould is removed after the filler(s) have been placed on the lay-up and preferably fixed in place. The bladder is then placed in the cavity previously occupied by the mould. The bladder is then inflated to occupy the volume bound by the reinforcement material and the filler(s). The mould can then be reused.

In a preferred embodiment the bladder is pre-shaped or thermoformed to occupy the same shape as the mould when it is inflated. Matching the bladder shape to the mould improves the distribution of pressure exerted by the bladder on the reinforcement material and filler. This in turn results in a more even distribution of resin in the final cured component. A pre-shaped bladder reduces the likelihood of the bladder not fully occupying the internal volume. Failure to fully occupy the volume results in regions of resin which accumulate during infusion, which in turn causes defects in the finished component.

The bladder is preferably formed from a thermoplastic sheet material. The bladder surface may be textured or embossed. We have discovered that this improves air removal and promotes infusion of the dry preform with resin.

In an embodiment of the present invention, the filler may be formed from any material suitable for use as the stringer or panel preform, for example it may comprise prepreg, dry fibre or a pre-cured fibre reinforced polymer. It may also be formed of materials such a plastic, wood, metal or any other solid material.

In a preferred embodiment the filler is secured in place with an adhesive or inherent tack in the filler material. In a particularly preferred embodiment the filler comprises dry reinforcement fibres with at least one thermoplastic coating. The thermoplastic can be melted to 'weld' the reinforcement fibres in position.

The filler may comprise a chopped fibre. The filler may comprise fibre tows. The filler may also comprise a fibre in combination with a resin. The resin may comprise a thermoset resin or a thermoplastic resin. The filler may also comprise a dry infusion tape material such as HiTape® as supplied by Hexcel Composites or TX1100 as supplied by Cytec.

In an embodiment of the present invention the filler is incorporated into the finished composite component. In an alternative embodiment the filler is configured to be removed after the stringer and panel have cured. A filler with a low surface energy coating (for example PTFE) will enable the such removal. Alternatively the filler may comprise a separable layer that remains integrated into the composite while the rest of the filler is removed.

In embodiments where a bladder is used as the mould, or the mould is replaced with a bladder, preferably a rigid or semi rigid sheet material may be placed between the bladder and reinforcement material. The use of such sheet material promotes an even distribution of pressure on the reinforcement material from the bladder. An even distribution of pressure promotes an even distribution of resin during the infusion stage, and reduces defects due to over-impregnation occurs. In a preferred embodiment, the rigid or semi-rigid sheet material has a textured surface to promote air removal and resin flow. This obviates the need for a conventional bleeder layer or distribution mesh for promoting air removal and resin flow. The rigid or semi-rigid sheet material may comprise embossing, preferably in the form of channels.

The rigid or semi rigid material may comprise similar materials to the composite component, e.g. it may be prepreg, or a cured fibre reinforced polymer. It may also be formed of solid sheet materials such a plastic, wood or metal. Preferably the rigid material comprises a low surface energy coating, this may be for example, a fibre reinforced laminate coated with PTFE. The rigid material may comprise single or multiple layers and may be shaped to the contours of the internal surface of the stringer. The rigid or semi rigid material may be incorporated into the cured component following the infusion and cure steps, or preferably, it is removed after cure.

In a preferred embodiment of the present invention the stringer preform is brought into contact with the panel preform once the filler has been placed.

In an embodiment of the present invention the stringer preform comprises at least one layer of dry fibre reinforcement material, where 'dry' refers to a material free from resin. The dry fibre reinforcement material may comprise woven, non-crimped or unidirectional fabrics. The dry fibre reinforcement material may be placed by hand lay-up, automated fibre placement or by automated tape lay-up. The dry fibre reinforcement material may also comprise a toughener, for example those described in US2010 0228001 A1 and FR2 937 583 A1, both incorporated herein by reference. In a preferred embodiment the toughener can be melted with applied heat, placed against the mould or adjacent fibre layer and then allowed to cool to fix the reinforcement material in position during lay-up. In an embodiment the fibrous reinforcement can be fixed in place by melting using an automated tape lay-up apparatus.

In an embodiment of the present invention at least one layer of the stringer preform material may be pre-impregnated with a curable resin. The impregnated stringer preform layer(s) may comprise woven, non-crimped or unidirectional fabrics combined with a curable resin. The reinforcement material may comprise both a pre-impregnated reinforcement material and a dry fibre reinforcement material.

In an embodiment of the present invention, the stringer preform is arranged to be in contact with a stringer mould. This may be achieved by first applying the stringer preform material directly to the surface of a stringer mould. Alternatively, the reinforcement material may be applied first to a first mould. An example is a caul plate shaped to the external surface of a stringer. A second mould which is a mould of the present invention and therefore configured for placement of the filler, is placed against the stringer preform in the first mould. In this embodiment the cavity of the first mould is configured to conform to the second mould. The first mould may comprise a textured surface to promote air removal and resin flow. This obviates the need for a conventional bleeder layer or distribution mesh for promoting air removal and resin flow. The mould may comprise embossing, preferably in the form of channels.

In an embodiment of the present invention, the panel preform comprises at least one layer of dry reinforcement material. The dry reinforcement material may comprise woven, non-crimped or unidirectional fabrics. The panel reinforcement material may be placed against a substantially flat mould that defines the outer shape of the panel. This may be placed against the mould by hand lay-up, automated fibre placement or by automated tape lay-up.

According to another invention there is provided a surface material comprising a sheet material having an air permeable structure to allow air removal, said surface material being locatable on an outer surface of a panel preform. The permeable sheet material may comprise a conductive material such as a metal. The permeable sheet material may be in the form of an electrically conductive foil (ECF) material. The ECF material is preferably in the form of an expanded copper foil. Alternative conductive sheet materials may comprise aluminium, brass, copper, Inconel, nickel alloys, phosphor bronze, stainless steel, titanium, zinc and/or alloys or combinations of the aforesaid metals. Examples of a suitable product is Microgrid® as supplied by Dexmet Inc.

The permeable sheet material has the important advantage of increasing manufacturing efficiency of the combined panel and stringer as this obviates the need for application of electrically conductive materials to the panel preform following its cure. The permeable sheet material is preferably in contact with a mould or tool surface. This obviates the need for a distribution mesh and/or peel ply and thus removes the need for the use of additional vacuum consumables such as bleeders and peel ply.

In an embodiment of the present invention the panel preform may comprise at least one layer of reinforcement material pre-impregnated with a curable resin. The impregnated reinforcement material may comprise woven, non-crimped or unidirectional fabrics combined with a curable resin. This may be placed against the mould by hand lay-up, automated fibre placement or by automated tape lay-up.

In a further embodiment of the invention, the preform panel comprises a prepreg layer wherein the prepreg layer comprises at least one tacky surface. The advantage of this tacky surface is that it holds the panel preform in place.

In an embodiment of the present invention panel preform may comprise at least one layer of a pre-cured laminate. The pre-cured laminate may comprise a fibrous reinforcement material combined with a cured resin.

In an embodiment of the present invention the panel preform may comprise any of a cured laminate, a pre-impregnated reinforcement material and a dry reinforcement material. In a preferred embodiment the skin layer comprises the same reinforcement material as the stringer preform.

The fibrous reinforcement of the panel preform or of the stringer preform may be selected from hybrid or mixed fibre systems that comprise synthetic or natural fibres, or a combination thereof. The fibrous reinforcement may preferably be selected from any suitable material such as fiberglass, carbon or aramid (aromatic polyamide) fibres. The fibrous reinforcement is preferably carbon fibre.

The fibrous reinforcement may comprise cracked (i.e. stretch-broken) or selectively discontinuous fibres, or continuous fibres. The fibrous reinforcement may be in the form of a woven, non-crimped, non-woven, unidirectional, or multi-axial textile structure. The woven form may be selected from a plain, satin, or twill weave style. The non-crimped and multi-axial forms may have a number of plies and fibre orientations. Such styles and forms are well known in the composite reinforcement field, and are commercially available from a number of companies, including Hexcel Reinforcements (Les Avenieres, France).

Exemplary layers of unidirectional fibrous tows are made from HexTow® carbon fibres, which are available from Hexcel Corporation. Suitable HexTow® carbon fibres for use in making unidirectional fibre tows include: IM7 carbon fibres, which are available as tows that contain 6,000 or 12,000 filaments and weight 0.223 g/m and 0.446 g/m respectively; IM8-IM10 carbon fibres, which are available as tows that contain 12,000 filaments and weigh from 0.446 g/m to 0.324 g/m; and AS7 carbon fibres, which are available in tows that contain 12,000 filaments and weigh 0.800 g/m, tows containing up to 80,000 or 50,000 (50K) filaments may be used.

The reinforcement fibres can be selected from any of the following commercially available high performance fibres which may be used alone or in combination:—aramid (e.g. Kevlar™), glass, carbon, ceramic, hemp, or polyolefin. Carbon fibres are the preferred material, particularly standard or intermediate modulus fibres of between 3,000 to 24,000 filaments per fibre tow. The desirable reinforcement form is a woven or non-crimped textile structure of between 150 to 1,000 gm$^{-2}$ fibre areal weight. Typical weave styles include plain, satin and twill weaves. Non-crimped or multi-axial reinforcements can have a number of plies and fibre orientations such as +45/−45; 0/+45/−45; 0/+45/−45/90. Such styles are well known in the composite reinforcement field and are available from a number of companies including Hexcel Reinforcements, Les Avenieres, France. Preferably the reinforcement fibres are arranged in a unidirectional fabric. The surface mass of fibres within the fibrous reinforcement is generally 80 to 4,000 g/m$^2$, preferably 100 to 2,500 g/m$^2$, and especially preferably 150 to 2,000 g/m$^2$. The number of carbon filaments per tow can vary from 3,000 to 320,000, again preferably from 6,000 to 160,000 and most preferably from 12,000 to 48,000. For fibreglass reinforcements, fibres of 600 to 2,400 tex are particularly adapted.

In an embodiment of the present invention the stringer and panel lay-up is processed to form a completed stringer stiffened panel. In a preferred embodiment the lay-up is infused with a curable resin and subsequently cured. In a particularly preferred embodiment the stringer and panel may be infused and cured in one shot.

The RTM processes applicable for this invention includes all known resin infusion processes including ScRIMP (Seeman composites resin infusion moulding process), VaR™ (vacuum assisted resin transfer moulding), VAP (vacuum assisted processing) and RFI (resin film infusion) processes. In such infusion methods the matrix resin is of a viscosity such that, during the resin injection stage, the resin passes through the fibrous reinforcement material. These technologies are described in chapter 9 of "Manufacturing Processes for Advanced Composites", F. C. Campbell, Elsevier, 2004.

Once the lay-up is assembled it is then vacuum bagged and cured in an oven or autoclave. If the part is processed by a combination of infusion and prepreg, the prepreg may be co-cured with the infused resin. The prepreg and optionally the infusion resin can be cured by exposure to an externally applied elevated temperature usually in the range 70° C. to 110° C., preferably in the range of from 70° C. to 200° C., and more preferably from 120° C. to 180° C. and/or combinations of the aforesaid ranges, and optionally at elevated pressure, to produce a cured stringer and panel.

Curing at a pressure close to atmospheric pressure can be achieved by the so-called vacuum bag technique. This involves placing the stringer and panel assembly in an air-tight bag and creating a vacuum on the inside of the bag, and the resin is then infused and cured by externally applied heat to produce the moulded part. The use of the vacuum bag has the effect that the lay-up experiences a consolidation pressure of up to atmospheric pressure, depending on the degree of vacuum applied. The assembly may also be cured at higher temperatures with an autoclave. The vacuum also de-bulks the dry reinforcement material and/or prepreg.

Upon curing, the lay-up becomes a composite part, suitable for use in a structural application, such as for example on an aerospace structure. Such composite laminates can comprise structural fibres at a level of from 80% to 15% by volume, preferably from 58% to 65% by volume.

In a preferred embodiment of the invention the matrix comprises a thermosetting resin, preferably an epoxy resin. A wide variety of epoxy resins are suitable for use in the matrix of the present invention. Epoxy resins are organic materials having an average of at least 1.5, generally at least 2, reactive 1,2-epoxy groups per molecule. These epoxy resins can have an average of up to 6, preferably up to 4, most preferably up to 3, reactive 1,2-epoxy groups per molecule. These epoxy resins can be monomeric or polymeric, saturated or unsaturated, aliphatic, cyclo-aliphatic, aromatic or heterocyclic and may be substituted, if desired, with other substituents in addition to the epoxy groups, e.g. hydroxyl groups, alkoxy groups or halogen atoms.

Suitable examples include epoxy resins from the reaction of polyphenols and epihalohydrins, poly alcohols and epihalohydrins, amines and epihalohydrins, sulfur-containing compounds and epihalohydrins, polycarboxylic acids and epihalohydrins, polyisocyanates and 2,3-epoxy-1-propanol (glycidyl) and from epoxidation of olefinically unsaturated compounds.

Preferred epoxy resins are the reaction products of polyphenols and epihalohydrins, of polyalcohols and epihalohydrins or of polycarboxylic acids and epihalohydrins. Mixtures of polyphenols, polyalcohols, amines, sulfur-containing compounds, polycarboxylic acids and/or polyisocyanates can also be reacted with epihalohydrins. Illustrative examples of epoxy resins useful herein are described in The Handbook of Epoxy Resins by H. Lee and K. Neville, published in 1967 by McGraw-Hill, New York, in appendix 4-1, pages 4-56, which is incorporated herein by reference.

For bisphenol-A type epoxy resin the average epoxy equivalent weight is advantageously from about 170 up to about 3000, preferably from about 170 up to about 1500. The average epoxy equivalent weight is the average molecular weight of the resin divided by the number of epoxy groups per molecule. The molecular weight is a weight average molecular weight.

The preferred thermoset matrices for RTM processes are epoxy or bismaleimide (BMI) with suitable epoxy examples being HexFlow® RTM 6 or RTM 120. A typical BMI matrix is HexFlow® RTM 651. HexFlow® VRM 34 may be used for Vacuum-assisted Resin Transfer Moulding (VaR™) applications. All of the above materials are available from Hexcel Composites, Duxford, UK.

Preferred examples of epoxy resins particularly suitable for use with pre-impregnated reinforcement materials are those having an average epoxy equivalent weight of from about 170 to about 200. Such resins are commercially available from The Dow Chemical Company, as D.E.R. 330, D.E.R. 331 and D.E.R. 332 epoxy resins. Further preferred examples are resins with higher epoxide equivalent weight, such as D.E.R. 667, D.E.R. 669 and D.E.R. 732, all of which are commercially available from The Dow Chemical Company, or Araldite MY0500, MY0150, MY0600, MY0610, MY721 from Huntsman.

Another class of polymeric epoxy resins which can be used in the resin matrix includes the epoxy novolac resins. The epoxy novolac resins can be obtained by reacting, preferably in the presence of a basic catalyst, e.g. sodium or potassium hydroxide, an epihalohydrin, such as epichlorohydrin, with the resinous condensate of an aldehyde, e.g. formaldehyde, and either a monohydric phenol, e.g. phenol itself, or a polyhydric phenol. Further details concerning the nature and preparation of these epoxy novolac resins can be obtained in Lee, H. and Neville, K. Handbook of Epoxy Resins, McGraw Hill Book Co. New York, 1967, which teaching is included herein by reference. Other useful epoxy novolac resins include those commercially available from The Dow Chemical Company as D.E.N. 431, D.E.N. 438 and D.E.N. 439 resins, respectively.

In alternative embodiments any resin from the following classes may also be used as the thermoset resin: benzoxazine resins, vinyl ester resins, unsaturated polyester resins, urethane resins, phenol resins, melamine resins, maleimide resins, cyanate resins and urea resins. Any resin suitable for use as a reactant for the reactive cross-linked thermoset coating is suitable for use in the matrix.

A variety of amine curing agents can be used in the matrix. The amine curing agents which may be employed are primarily the multifunctional, preferably di- to hexafunctional, and particularly di- to tetrafunctional primary amines. Examples of such amine curing agents include, but are not limited to, isophorone diamine (IPDA), ethylene diamine, diaminodiphenylsulfones, tetraethyl amine, 2,4-diaminotoluene (DAT) diamines and dicyandiamide (DICY). Mixtures of two or more of the amine curing agents can also be used. Also modified hardeners where amines are reacted in vast excess with epoxy resin are good candidates as amine curing agents. Any curing agent suitable for use as a reactant for the reactive cross-linked thermoset coating is suitable for use in the matrix.

The matrix may also comprise an accelerator. Such accelerators are known in the art. Suitable accelerators are, for example, amines, preferably ethylene diamine, diethylene triamine, dicyandiamide, triethylene tetraamine, aminoethyl piperazine, organic acids, e.g. dicarboxylic acids, phenol compounds, imidazole and its derivatives, urea based curing agents e.g. those under the commercial name Urone®, and calcium nitrate.

The invention will now be described by way of example only and with reference to the following Figures in which.

Figure 1:
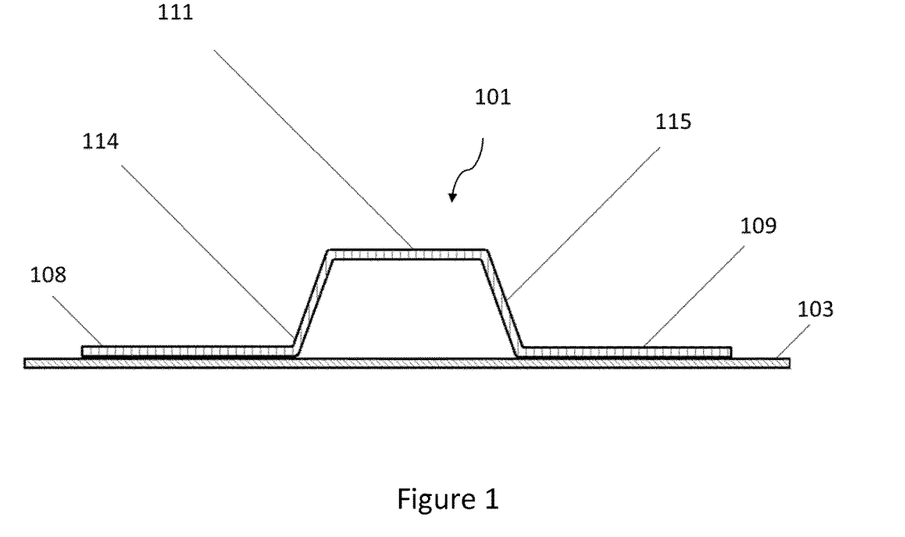
FIG. 1 is a schematic drawing of an omega stringer or stiffener mounted on a panel or skin according to an embodiment of the invention.

The schematic drawing of FIG. 1 illustrates an omega stringer 101 bonded to a panel 103. The stringer comprises two flanges 108, 109, a cap 111 and two webs 114, 115. The flanges provide a contact area to bond the stringer to the panel. The manufacture of stiffened panel is described with reference to FIGS. 2, 3, 4 and 5.

Figure 2:
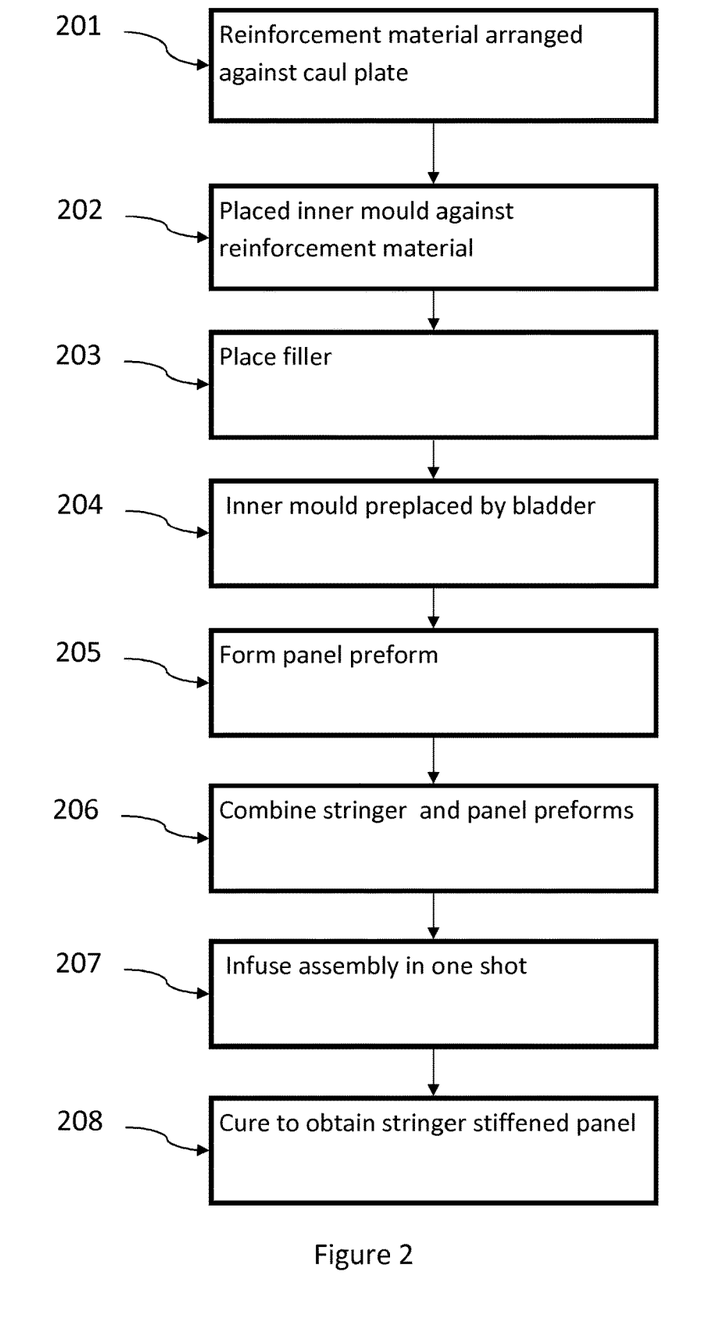
FIG. 2 is a flowchart of a method of forming a stringer stiffened panel in accordance with another embodiment of the present invention.

In FIG. 2, the method comprises the step of first arranging reinforcement material against a caul plate 201 to form the stiffener preform. The caul plate is shaped to the external dimensions of the stringer. This step is optional as the material could be placed directly onto an inner mould. Preferably multiple layers of dry fibre reinforcement material are used, however at least one layer of prepreg may also be included. A mould is placed against the reinforcement material in the caul plate 202. The filler is then placed between the inner mould and reinforcement fibres into spaces formed between the mould and the stringer preform 203. The mould may then be replaced by a bladder 204 that is shaped to have the same overall shape as the mould when inflated. Laminates may be placed between the bladder and the reinforcement material to distribute pressure more evenly. It is understood that is it also an embodiment of the present invention that the mould remains in place and is not replaced with a bladder. Layers of reinforcement material are laid-up on a mould shaped to the desired external shape of the panel to form a panel preform 205. The panel preform may comprise dry fibrous reinforcement, prepreg or a combination of both.

The panel and stringer preforms are then brought together to form a panel and stringer lay-up 206. The assembly can then be vacuum bagged, optionally placed in an auto-clave or oven and infused with a curable resin in one shot. Silicon inserts (intensifiers) can be placed in the corners of the caul plate to evenly distribute the consolidating force from the vacuum bag. The infused resin is cured to obtain a completed stringer stiffened panel free from defects on the panel surface.

Figure 3:
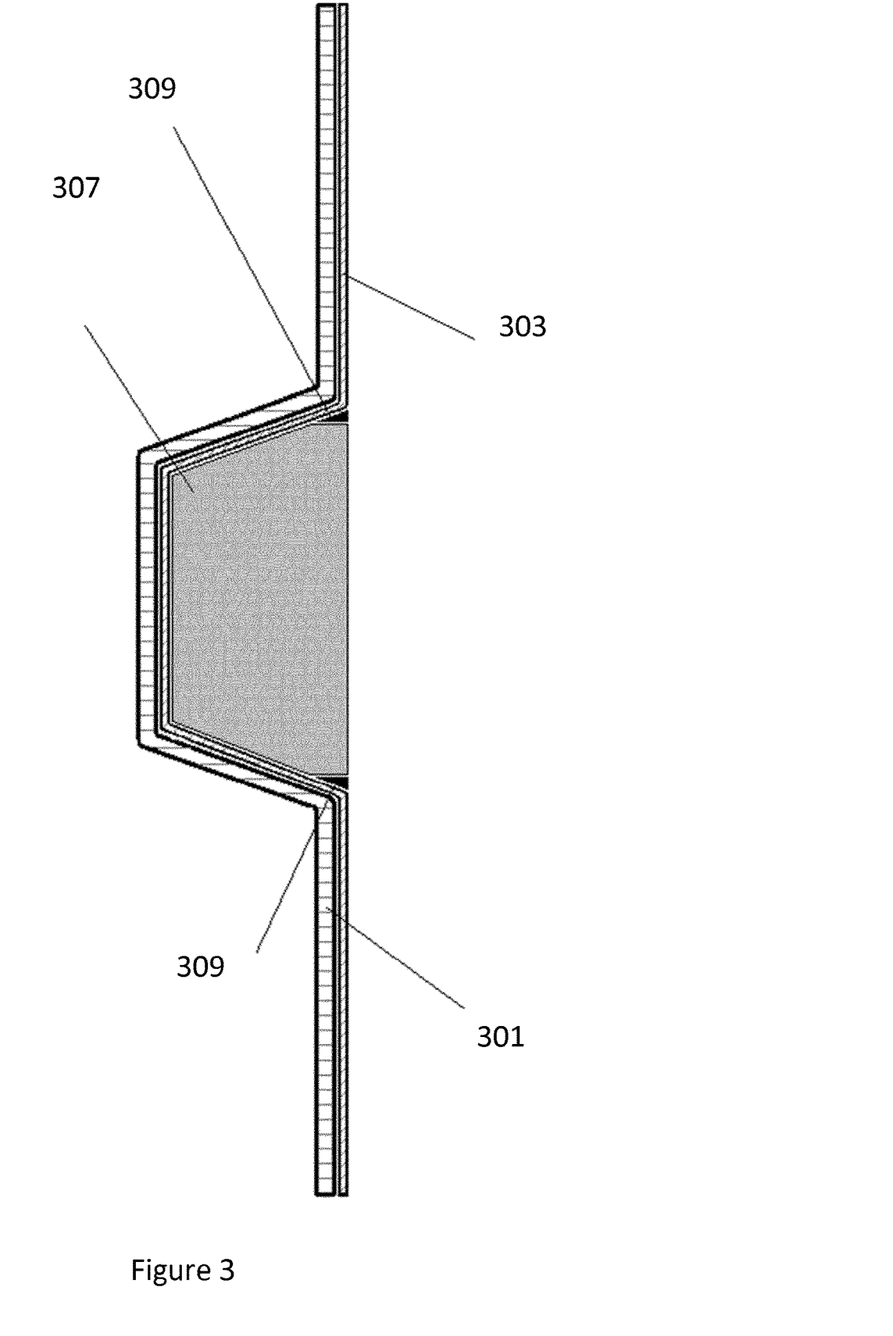
FIG. 3 is a schematic drawing of an assembly in accordance with step 203 of the method illustrated in FIG. 2.

FIG. 3 illustrates an assembly following step 203 of FIG. 2. The assembly comprises a caul plate 301, layers of fibrous reinforcement material 303 a mould 307 and two fillers 309.

Figure 4:
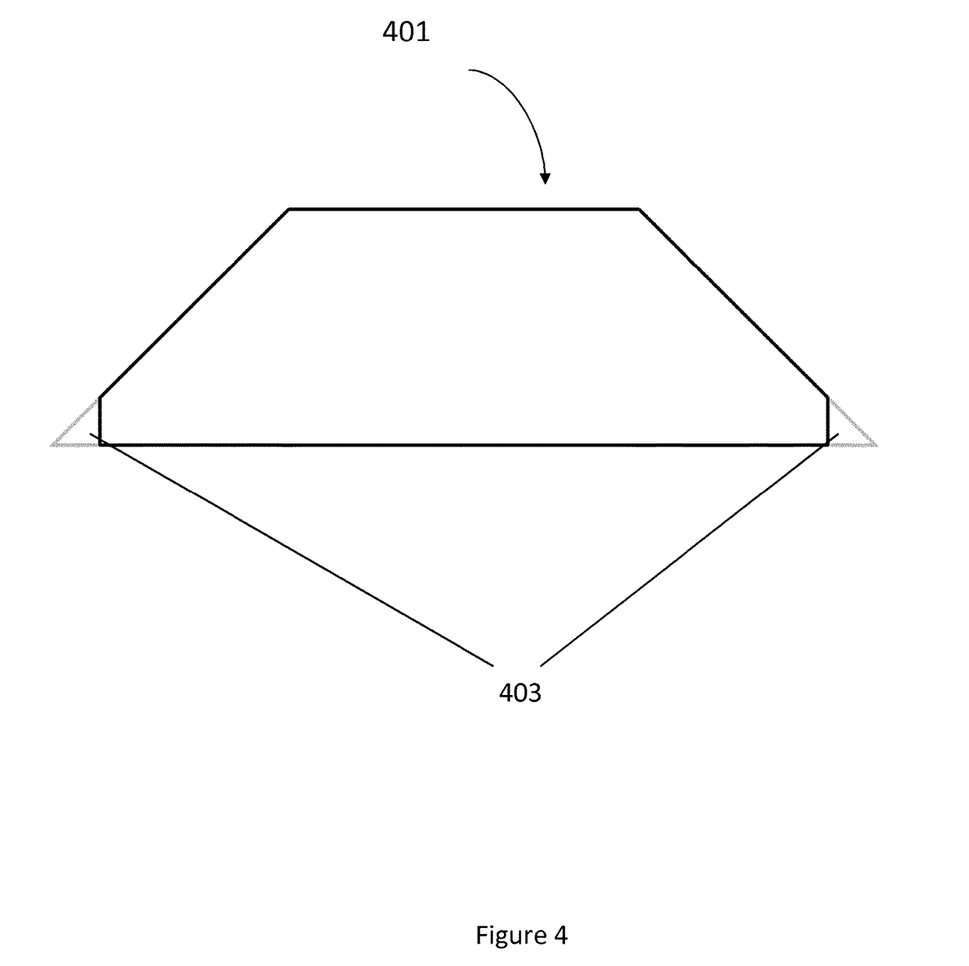
FIG. 4 is a schematic drawing of a mould in accordance with another embodiment of the present invention.

FIG. 4 illustrates the cross section of a mould 401 having acute corners 403 of the cross section that are configured to control the placement of the filler material.

Figure 5A:
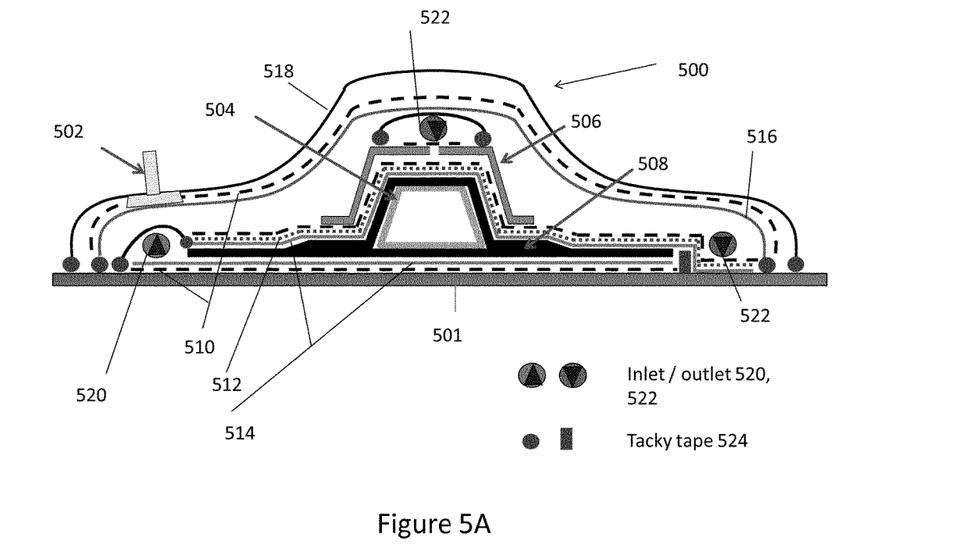
FIG. 5A and FIG. 5B disclose a skin panel preform and stringer preform assembly inside a vacuum bag to allow resin infusion wherein the surface configuration of the skin panel has been varied.

In FIG. 5A, a skin and panel preform 508 assembly 500 is presented inside a vacuum bag 518. Inside the vacuum envelope 518 is provided on a mould 501 a layer of a distribution mesh or breather 510 in combination with peel ply 514 to ensure good evacuation of the surface of the panel preform to promote resin infusion and to allow the preform to be released from the mould following cure and having the desired surface properties. Within the stringer preform, a bladder 504 is located. This bladder 504 performs the function as hereinbefore described. For the sake of clarity, the filler is not shown here. Peel ply 514 is also applied over the preform 508 on the side which is not in contact with the mould 501 together with a perforated foil 512 in combination with a distribution mesh 510 to again promote air evacuation and infusion of the resin. An outer stringer mould 506 is located over the stringer preform 508. This stringer mould contains an aperture 522 to allow infusion resin to be applied within its own vacuum envelope 522. This assembly is further provided within a first envelope 516 onto which is located a further distribution mesh 510 inside the vacuum bag 518. Vacuum is applied within the vacuum bag 518 via vacuum port 502.

The infusion resin is applied through inlet ports 520 and removed through outlet ports 522.

Figure 6:
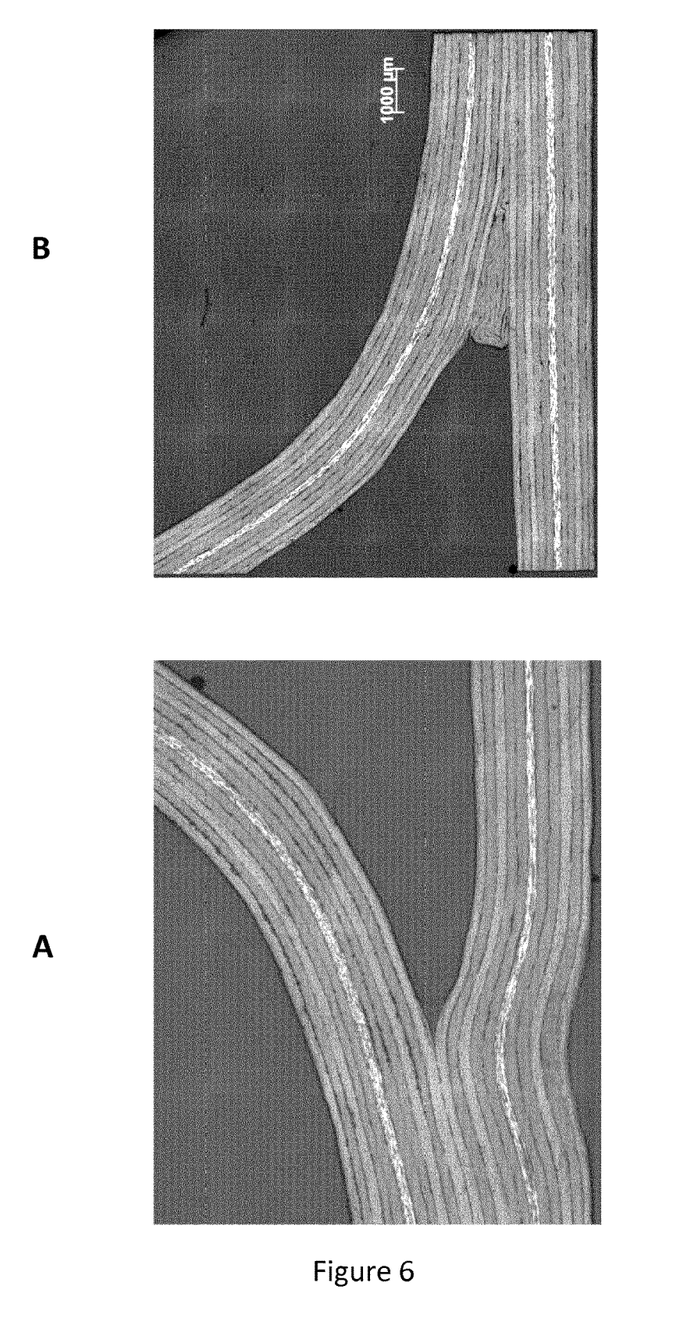
FIG. 6 is a micrograph from A: a cured stringer and panel section without a filler, and a micrograph from B: a cured stringer stiffened panel section with a filler, made by a method in accordance with a further embodiment of the present invention.

In use, the assembly 500 is prepared by laying up the relevant materials as shown in FIG. 6A starting with the materials which are in contact with the mould 501 surface (so from the mould surface up). Vacuum is applied via the port 502 which allows for the removal of air from within the assembly followed by the influx of infusion resin such as RTM6 (produced by Hexcel Corporation) via the inlet port 520. Once the perform is saturated with resin and resin flows out of the outlet 522, the influx of infusion resin is stopped by closing off of the outlet 522 which may also be followed by the closing off of the inlet 520.

The vacuum pressure is maintained on the part and the temperature of the infused preform is raised to promote cure of the resin. Following this, the cured preform is removed from the mould 501 and it is ready for further finishing.

Figure 5B:
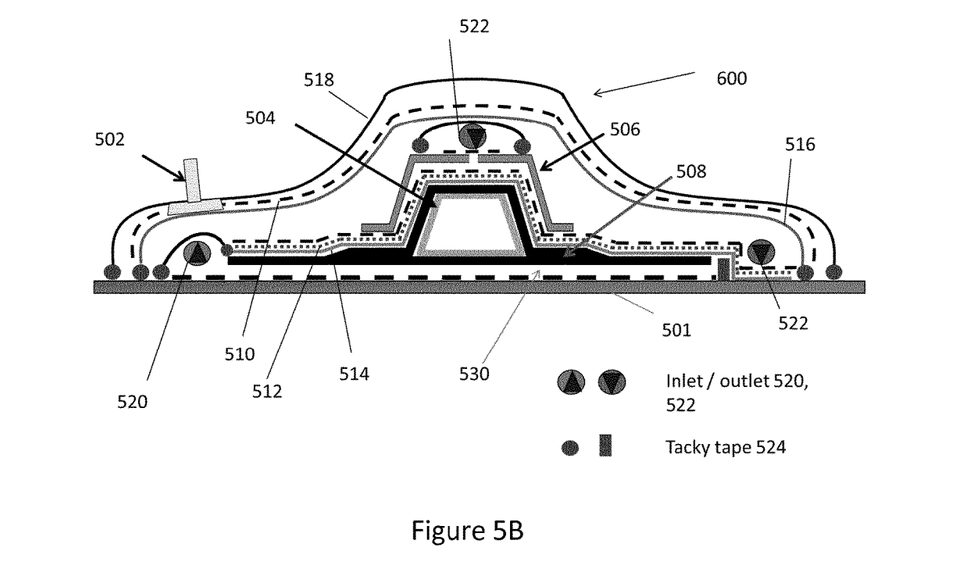

FIG. 5B shows a similar assembly 600. For the sake of clarity the reference numerals for identical parts in FIG. 5B are the same as in FIG. 5A. However the assembly 600 differs from the assembly 500 in that the peel ply 514 and distribution mesh 510 have been replaced by an expanded conductive foil 530 in the form of Dexmet expanded copper foil. This surface material performs in the same way as the distribution mesh 510 in allowing air removal and resin infusion of the skin panel perform, whilst obviating the need for further surface treatment of the cured preform to enable this to be conductive.

In use, the assembly 600 is evacuated and infused in the same way as the assembly 500 of FIG. 5A.

EXAMPLE

HiTape® material (as supplied by Hexcel Reinforcements, Les Avenieres) was deposited in multiple layers on the inner surface of a caul plate shaped to the outer surface of an omega shaped stringer or stiffener to form a stringer preform. Hitape® is a dry tape which comprises unidirectional carbon fibre tows having thermoplastic veils on either side of the tows to facilitate heat bonding of the tape during lay-up.

An inner mould was brought into contact with the stringer preform. This inner mould has a cross section of an isosceles trapezoid with the acute angles corners removed.

In one embodiment no filler material was used (Comparative Example). In the other embodiment filler material was used (Example). The filler material, also HiTape®, was placed in the space between the fibrous reinforcement and the mould along the lateral edges of the mould. The filler material was fixed in place by melting the veil in spots.

In both the Comparative Example and the Example, the mould was removed and replaced with an inflatable bladder which was subsequently inflated. The bladder was shaped so that when inflated it occupied the same volume as the mould.

In both examples, a panel preform was prepared by laying up HiTape® on the surface of a panel mould shaped to the desired shape of the panel. The panel preform and stringer preform assembly including bladder and caul plate were combined. Two pressure distributing blocks were placed against the caul plate. The assemblies were then vacuum bagged, infused with HexFlow® RTM 6 and cured according to the recommended cure schedule of RTM 6.

The micrograph of FIG. 6B shows a cross section of the cured stringer and panel assembly for the Example. No fibre distortion was evident on the panel where the flange transitions to the web. In contrast, for the Comparative Example of FIG. 6A which was formed without using filler, a significant distortion is evident.

The invention claimed is:

1. A method of preparing a stringer or stiffener and panel lay-up comprising the steps of:
   a) providing a stringer preform which comprises a reinforcement material, a panel preform, a filler and a mould, the mould being adapted to define an inner surface of a stringer;
   b) arranging the stringer preform to contact the mould;
   c) placing filler material between the mould surface and stringer preform;
   d) bringing the reinforcement material of the stringer preform into contact with the panel preform, wherein the shape of the mould is configured to control filler placement and/or filler shape and/or filler volume, and
   e) additional step of removing the mould and replacing said mould with an inflatable bladder.

2. The method of claim 1, wherein the mould is removed prior to resin infusion of the panel preform and/or stringer preform or following infusion of the panel preform and/or stringer preform prior to cure.

3. The method according to claim 2 wherein the bladder is shaped to fill the same volume as the mould when inflated.

4. The method according to claim 2 comprising an additional step of placing at least one rigid or semi-rigid sheet material between the panel preform and the inflatable bladder.

5. The method of claim 4 wherein the rigid or semi-rigid sheet is removed after curing.

* * * * *